UNITED STATES PATENT OFFICE.

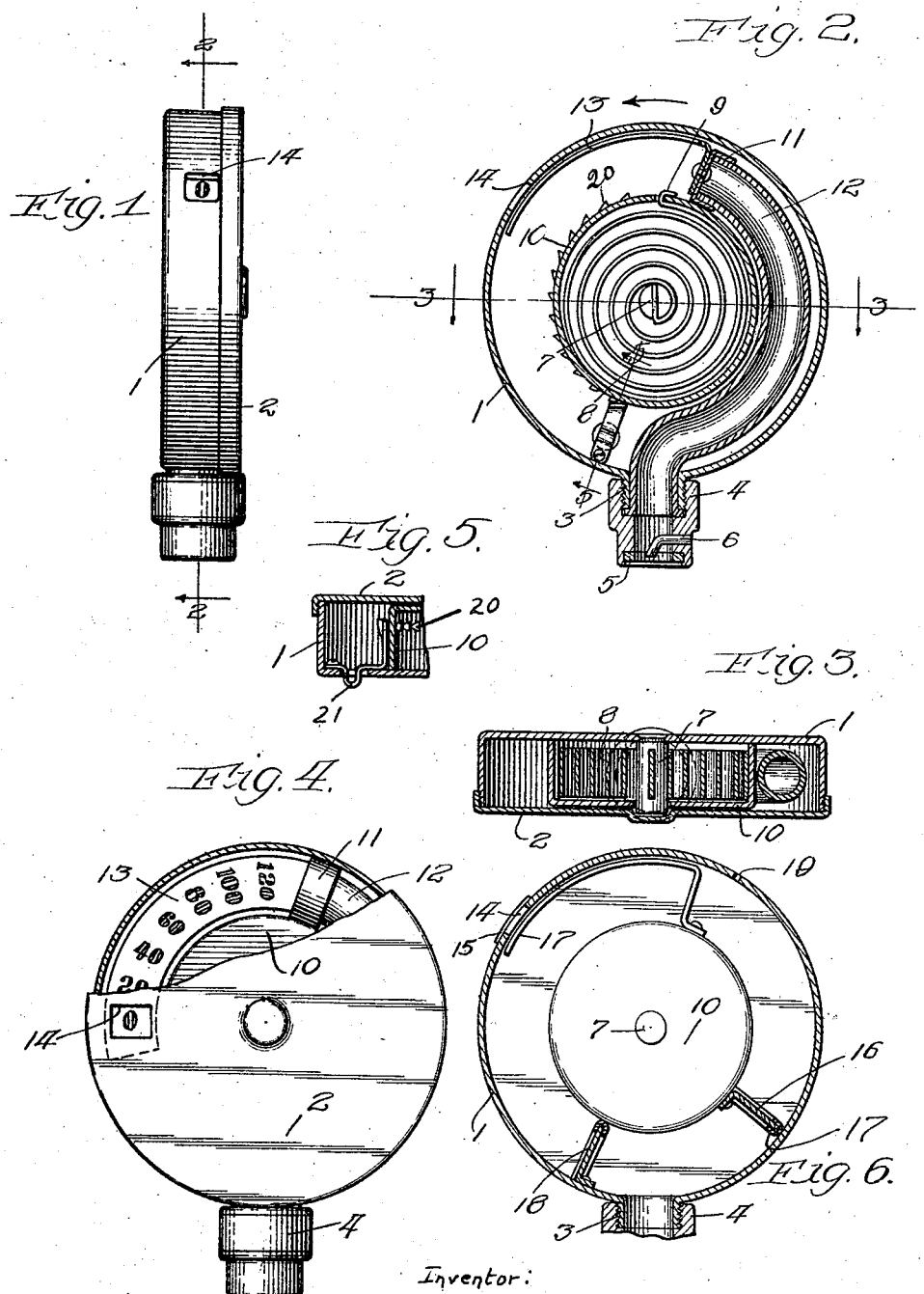

JACOB I. GLICKERMAN, OF CHICAGO, ILLINOIS.

TIRE GAUGE.

1,416,814.     Specification of Letters Patent.     Patented May 23, 1922.

Application filed December 29, 1919. Serial No. 347,995.

*To all whom it may concern:*

Be it known that I, JACOB I. GLICKERMAN, citizen of the United States, residing at Chicago, in the county of Cook and State of Illinois, have invented certain new and useful Improvements in a Tire Gauge; and I do hereby declare the following to be a full, clear, and exact description of the invention, such as will enable others skilled in the art to which it appertains to make and use the same.

My invention relates to pressure gauges, its general objects including the providing of an unusually simple and compact type of gauge. More particularly, my invention relates to the class of pressure gauge adapted for use in ascertaining the air pressure in pneumatic tires. For this purpose, my invention aims to provide a simple, inexpensive and compact gauge which will retain its initial size at all times and therefore will not have any projecting parts which might interfere with the convenient attaching and detaching of the gauge; to provide a novel mechanism whereby the indication of the gauge can readily be ascertained without requiring needles, gearing or other delicate parts; to provide simple and releasable means for causing the gauge to hold its indicating position when detached from the tire or other source of pressure; and also desirably to provide a simple substitute for the pistons or other packings, commonly employed in such pressure gauges. Still further objects will appear from the following specification and from the acompanying drawings, in which—

Fig. 1 is a side elevation of a gauge embodying my invention and designed for use as a tire gauge.

Fig. 2 is a longitudinal and vertical section taken along the center line of Fig. 1.

Fig. 3 is a horizontal and central section taken along the correspondingly numbered line of Fig. 2.

Fig. 4 is a front elevation of another embodiment of my invention, namely one in which the indications are read from the flat face of the casing, with a part of the casing cut away to show the indicating strip.

Fig. 5 is an enlarged fragmentary section taken along the correspondingly numbered line of Fig. 2 and showing the spring which acts as a ratchet pawl.

Fig. 6 is a section similar to Fig. 2, showing another embodiment of my invention, namely one not employing a flexible tube.

In the embodiment of Figs. 1, 2 and 3, the gauge of my invention includes a shallow and substantially cylindrical casing comprising a main part 1 and a cover 2. The main portion 1 of the casing has a threaded inlet 3 screwed into a nipple 4, which nipple is designed to slip over the inlet of the valve as used on tires. The nipple 4 has a rubber packing ring 5 disposed in its mouth so as to afford a joint when slipped upon the tire valve in the usual manner, and also has suitable means, such as a bent pin 6 adapted to engage the stem of the tire valve so as to open this valve when the gauge of my invention is set in operative position upon the valve.

Rigidly secured to the body 1 of the casing is a shaft 7 which is slotted to interlock with the inner end of a spiral spring 8. This spiral spring is wound around the shaft and has its outer end 9 hooked through a slot in a drum 10 which is free to rotate on the shaft 7. Fastened to this drum 10 (as by soldering) is a cup 11 which forms a tight sealing head for one end of a soft rubber tube 12. This rubber tubing extends in the space between the drum 10 and the cylindrical wall of the casing portion 1, somewhat after the manner shown in Fig. 3, and the lower end of the tube is desirably flared and clamped between the threaded inlet 3 of the casing and the nipple 4. Consequently, the flexible tube 12 forms a simple means for connecting the inlet of the pressure gauge with the head 11 and for preventing air as admitted from the tire from reaching other parts of the casing of my gauge. Consequently, the flexible tube 12 forms a simple means for connecting the inlet of the pressure gauge with the head 11 and for preventing air admitted from the tire from reaching other parts of the casing of my gauge. Rigidly connected to the drum 10, as for example by being fastened to the cup 11, is an indicator strip 13 which extends past a relatively narrow opening or window 14 in the cylindrical wall of the casing. This strip 13 carries a series of markings indicating various pressures.

In operation, when my gauge is affixed to the valve stem of an ordinary tire valve in the usual manner, a relatively small part of the compressed air in the tire will enter the rubber tube 12, thereby exerting pressure against the head of the cup 11, so that this pressure will rotate the drum 10 in the direction of the arrow of Fig. 2 against the tension of the spring 8. Consequently, the indicating strip 13 will be correspondingly moved in this same direction, so that the indication visible through the window 14 will correspond to the extent of this movement. In practice, the elasticity of the rubber tube 12 will also tend to oppose its stretch and will therefore cooperate with the spring 8 in resisting the movement of the indicating member 13 which exposes its indications successively through the window or opening 14. However, this elasticity may vary somewhat with variations in the thickness and age of the rubber, hence I desirably do not depend to any material extent on the same for resisting the movement of the rotatable drum and the parts which are carried by this drum. Instead, I preferably depend for the greater part of the resistance on a spring, which can be accurately calibrated so as to insure the desired accuracy of the readings.

To insure a proper adjustment of the zero point of the pressure gauge with respect to the window, I desirably interlock the inner end of the spring with the shaft 7, and interlock this shaft with the body 1 of the casing after the parts have been set in place with the zero point in its desired position. In this way, I can readily allow for such variations as are apt to occur in the length of the longitudinally expansible tube 12. Then the cover 2 can afterwards be slipped into position.

In practice, the tire which is to be tested as to its pressure may have its valve disposed in an inconvenient position for reading the gauge while it is applied to the valve, or the wheel may be in too dark a place for easily taking the desired reading. I therefore desirably provide suitable means for causing the gauge to hold its pressure reading after it is detached from the valve of the tire or from any other source of pressure. This I may accomplish in any one of numerous ways, as for example by equipping a part of the periphery of the drum 10 with ratchet teeth 20 projecting into the path of a spring pawl 21 which is mounted within the casing of the gauge. Then I have here shown this spring pawl in Figs. 2 and 5 as having a bend projecting through an aperture in the casing, so that the user of the gauge can release the pawl by pressing inwardly on this bend, whereupon the spring 8 will return the drum and the indicating strip to their initial positions.

From the above description and illustrations it will be obvious that the gauge of my invention is extremely simple and that since the fluid pressure only enters the bore of the elastic tube which has its free end closed by the cup 11, I do not require the casing proper to be air-tight in construction. Furthermore, by varying the size of the spiral spring and correspondingly varying the markings on the indicating strip 13, I can readily adapt the gauge of my invention to considerable variations in pressure. Moreover, it will be evident that although I employ a movable part directly connected to the indicating scale, this does not project beyond the casing of the gauge, hence there is no projecting part to catch on spokes of the wheel or to interfere with the ready attaching or detaching of the gauge. So also, I am able to provide a dial type of gauge without employing gears, levers or other delicate and complicated mechanisms.

However, while I have heretofore described my invention in a desirable embodiment, I do not wish to be limited to the construction and arrangement thus disclosed, it being obvious that the same might be modified in many ways without departing from the spirit of the appended claims. For example, instead of having the indicating strip 13 curved flatwise into a form in which it extends concentric with a portion of the casing as in Fig. 2, I may employ a substantially arcuate form of strip having its indicating face parallel to one of the flat sides of the casing. In that case, the window or opening 14 would be in this flat side casing, as shown for example in Fig. 4. Nor do I wish to be limited to the use of a pressure confining tube, as some of the novel features of my invention may be accomplished without the latter. Thus Fig. 6 shows an embodiment of my invention in which the part of the casing behind the piston 16 is tightly sealed, the opening 14 being closed by a strip 15 of celluloid or the like. In this case I employ a web 16 secured to the drum 10 and peripherally packed by a binding 17 of leather or the like, which web acts as a piston traveling in the annular space between the drum and the cylindrical wall of the casing at one side of the latter. Then I fasten a similar web 18 to the casing and pack it for slidable engagement with the drum, and this web 18 prevents the air pressure from reaching the other side of the piston 16. With this embodiment, a pin hole 19 permits the escape of air in front of the piston, and the indicating strip 17 may be fastened direct to the drum as shown in Fig. 6.

I claim as my invention:—

1. In a pressure gauge, a substantially cylindrical casing having a lateral inlet and having a relatively small opening at a distance from the inlet, a shaft axial of the casing, a spiral spring disposed so that it can be wound on the shaft and having its inner end locked against rotation with respect to the casing, a drum rotatable on the shaft and housing the spring and interlocked with the outer end of the spring, an indication-carrying strip fast with respect to the drum and having its indicating portion adapted to move past the said opening, and means operable by fluid pressure for rotating the drum against the resistance of the spring to cause the indicating strip to move past the said opening, the said means including a substantially cup-shaped head fastened to the periphery of the drum, a nipple arranged for securing the casing to a source of pressure, and a longitudinally expansible tube having its major portion disposed within the casing and having one end secured to the said nipple and its other end closed by and secured to the cup-shaped head.

2. In a pressure gauge, a casing, a drum concentric therewith and rotatably mounted therein, a tube made of material adapted to be elongated by internal pressure disposed in single arcuate formation between the drum and the casing and respectively fastened at its ends to the drum and the casing, means for connecting one end of the tube to a source of pressure, and indicating means associated with the drum and visible from the exterior of the casing for indicating the elongation of the tube by internal pressure in terms of the said pressure, and ratchet means releasable from the exterior of the casing for latching the drum in the position to which it is moved by the elongation of the tube under pressure.

3. In a pressure gauge, a rotatable member, an indicator element carried by it, a spring resisting the rotation of the said member, an elastic tube adapted to be bodily elongated by internal pressure and so connected at its free end to the rotatable member that the elongation of the tube by internal pressure exerted between the ends of the tube will rotate the said member against the resistance of the said spring, a casing housing the aforesaid elements and having an aperture opposite the indicator element, and ratchet means releasable from outside the casing for latching the rotatable member in the position to which it is moved by the said pressure-effected rotation.

4. A pressure gauge as per claim 3, in which the ratchet means comprise ratchet teeth on the rotatable member and a spring pawl carried by the casing, the casing having an aperture affording access to the pawl for releasing the same from engagement with the ratchet teeth.

Signed at Chicago, Illinois, December 22nd, 1919.

JACOB I. GLICKERMAN.